(12) United States Patent
Benoit

(10) Patent No.: US 11,202,521 B2
(45) Date of Patent: Dec. 21, 2021

(54) POT SUSPENSION APPARATUS, SYSTEM, AND RELATED METHODS

(71) Applicant: Ryan Benoit, San Diego, CA (US)

(72) Inventor: Ryan Benoit, San Diego, CA (US)

( * ) Notice: Subject to any disclaimer, the term of this patent is extended or adjusted under 35 U.S.C. 154(b) by 410 days.

(21) Appl. No.: 16/255,617

(22) Filed: Jan. 23, 2019

(65) Prior Publication Data
US 2020/0205588 A1 Jul. 2, 2020

Related U.S. Application Data

(63) Continuation-in-part of application No. 29/675,447, filed on Jan. 2, 2019, now Pat. No. Des. 920,709.

(51) Int. Cl.
*A47G 7/04* (2006.01)
*A01G 9/02* (2018.01)

(52) U.S. Cl.
CPC ............ *A47G 7/044* (2013.01); *A01G 9/024* (2013.01)

(58) Field of Classification Search
CPC ........ A47G 7/044; A47G 7/045; A47G 7/047; A47G 7/00; A47G 7/04; A01G 9/024; A01G 9/022; A01G 9/02; E06B 7/28
See application file for complete search history.

(56) References Cited

U.S. PATENT DOCUMENTS 4,593,490 A  *  6/1986  Bodine  .................. A01G 9/022
                                                        47/79
4,635,394 A  *  1/1987  Brown  ..................... A01G 9/02
                                                        47/39

FOREIGN PATENT DOCUMENTS

JP    2002000080 A  *  1/2002  ............. A01G 9/024
KR    101877172 B1  *  7/2018  ............. A01G 9/024

OTHER PUBLICATIONS

Gordon, Chantal Aida, "How to Turn Your Clay Pots Into a Vertical Garden", https://web.archive.org/web/20160525071305/https://thehorticult.com/turn-your-clay-pots-into-a-vertical-garden-our-dark-ryewhole-foods-collabo/, published May 25, 2016.*

* cited by examiner

*Primary Examiner* — Kathleen I Alker
(74) *Attorney, Agent, or Firm* — Buche & Associates, P.C.; John K. Buche; Bryce A. Johnson

(57) ABSTRACT

Disclosed is a pot suspension apparatus that allows a user to safely, efficiently, and easily hang multiple pots from each other through its center drain hole so that the pots are suspended along the same vertical axis. The pot suspension apparatus features a rod with a hook and an eye, wherein the hook from one rod and can hang off of the eye of a second rod. The pot suspension apparatus also features multiple flanges that secure a pot in place along a rod and allow for organized and directed drainage of water through the suspended pots.

6 Claims, 6 Drawing Sheets

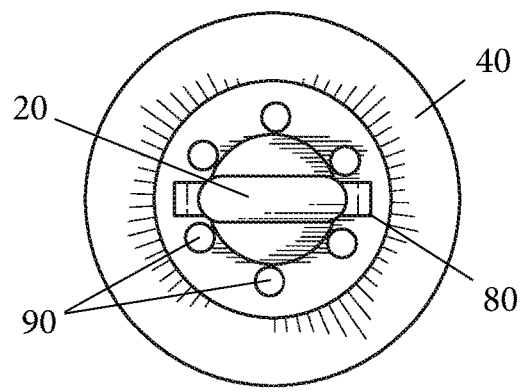
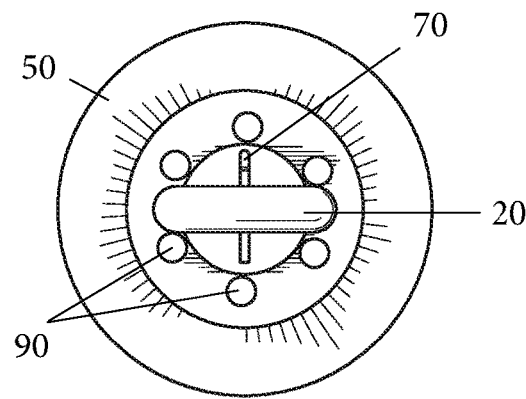
FIG. 4    FIG. 5
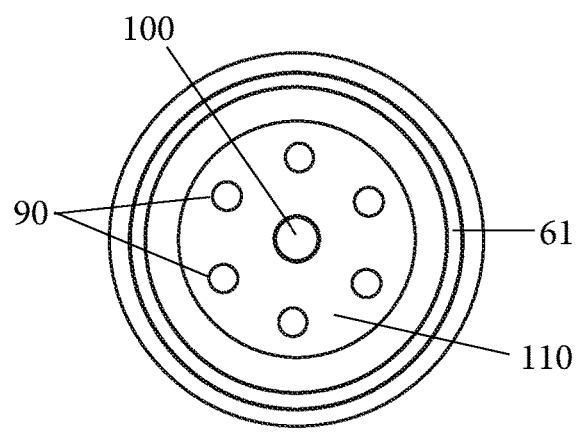
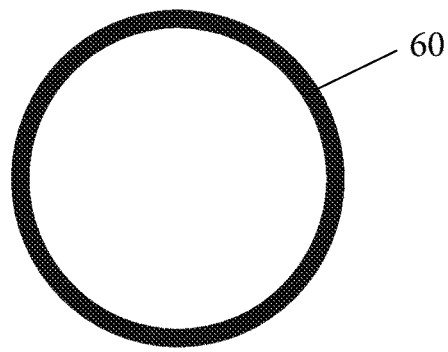
FIG. 6    FIG. 7

POT SUSPENSION APPARATUS, SYSTEM, AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of hanging pots.

Background of the Invention

The addition of plants and flowers can brighten and liven up any environment. Many individuals use pots to decorate their interiors, exteriors, patios, or gardens. Currently, individuals may place a pot on a ledge to display a plant or flower or they may hang a pot in an indoor or outdoor environment. However, there are no safe, efficient, and easy apparatuses that allow a user to hang multiple pots from each other to create a suspension effect, while also facilitating drainage. Thus, a need exists for an apparatus that can be universally used to hang pots through its center drain hole that allows a user to hang multiple pots along the same vertical axis. The applicant's apparatus, system, and related methods allows a user to easily install a pot onto a pot suspension apparatus through its drain hole and easily hang another pot suspension apparatus from another, thus creating an effect of pots being suspended in air.

SUMMARY OF THE INVENTION

In view of the foregoing, an object of this specification is to disclose a pot suspension apparatus that allows pots to be easily suspended along the same vertical axis and drain in this configuration.

Another object of this invention is to disclose a pot suspension apparatus that can be universally used with most pots with center drain holes.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 4 is an external view of the upper flange of the pot suspension apparatus;

FIG. 5 is an external view of the lower flange of pot suspension apparatus;

FIG. 6 is an interior view of the upper and lower flange of the pot suspension apparatus;

FIG. 7 is a perspective view of the o-ring gasket;

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a pot suspension apparatus, system, and related methods. In a preferred embodiment, the disclosed invention allows a user to easily and efficiently hang multiple pots on the same vertical axis to create a suspension-like appearance. The pot suspension apparatus is designed for nursery planter pots with a central hole in the bottom of the pot.

Figure 1:
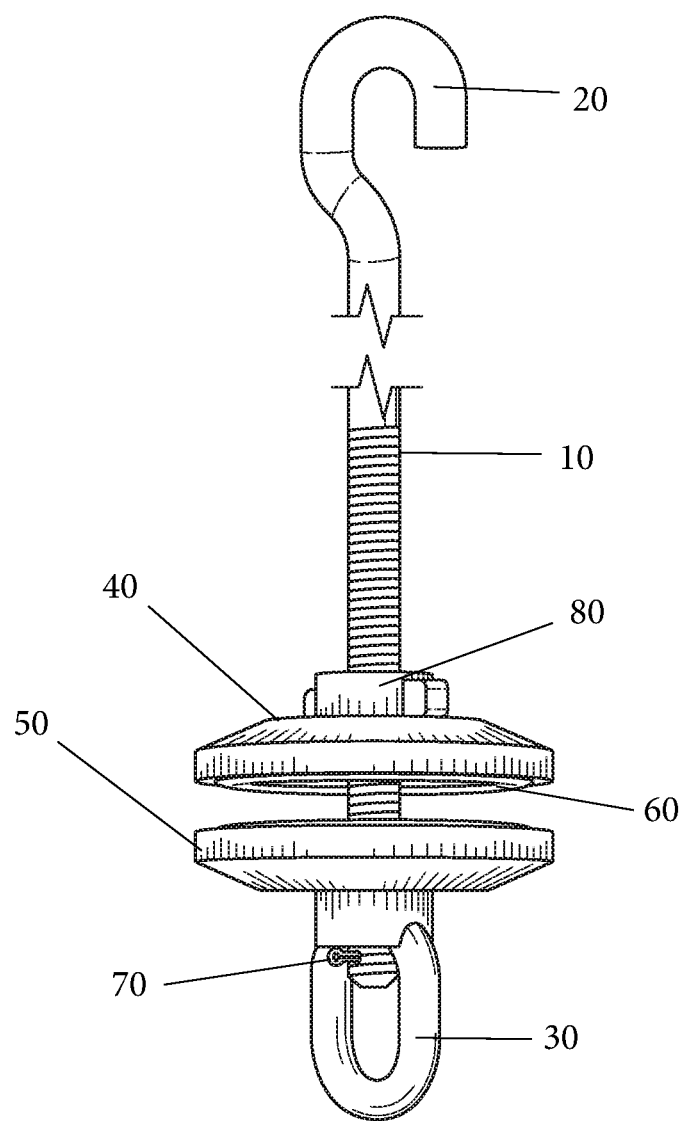
FIG. 1 is a perspective view of the pot suspension apparatus.

FIG. 1 is a perspective view of a preferred embodiment of the pot suspension apparatus. Referring to FIG. 1, the pot suspension apparatus may be defined by a rod 10 with a hook 20 and an eye 30 that is secured to the bottom of the rod 10 via threads and a pin 70. Still referring to FIG. 1, the pot suspension apparatus is further defined by an upper flange 40 and a lower flange 50. The rod 10 is threaded and designed to be inserted through the central bore of a pot. The upper and lower flanges 40,50 feature a centrally disposed bore 100 (see FIG. 6), wherein the rod 10 is also inserted. The upper flange his held at a certain height via the upper flange fastener 80 and the lower flange 50 is held in place via the eye 30. Since the rod 10 is threaded, the fastener 80 and eye 30 may be screwed onto the rod 10. The rod 10 may also be defined by varying lengths.

The eye 30 is located at the bottom rod so that it can easily receive the hook 20 of a second pot suspension apparatus, whereby, the appearance of multiple pots being suspended along the same axis is achieved.

Figure 2:
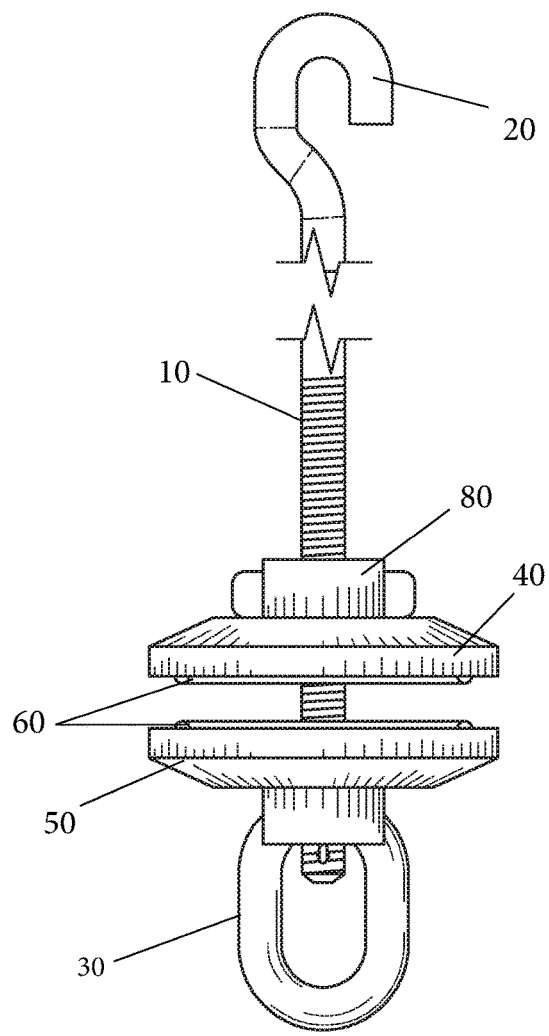
FIG. 2 is a side view of the pot suspension apparatus.
Figure 3:
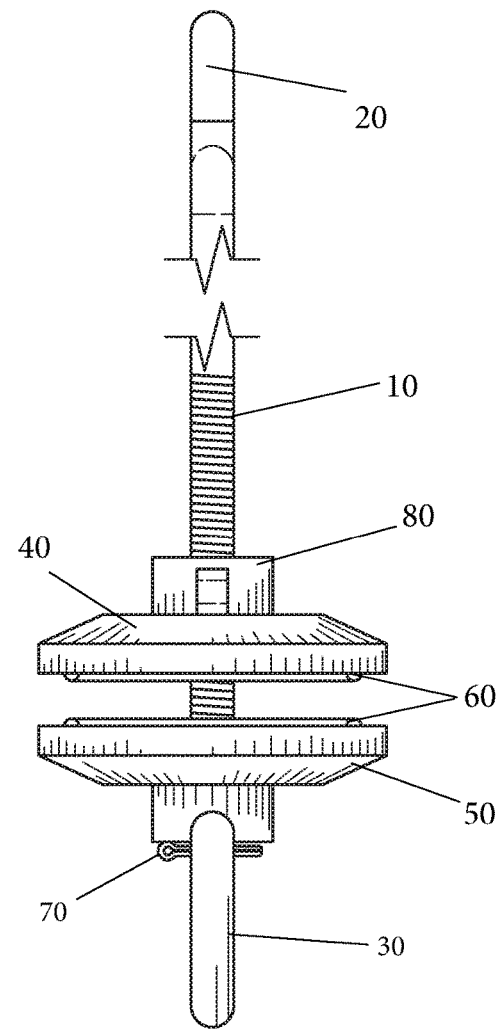
FIG. 3 is another side view of the pot suspension apparatus.

FIG. 2 is a side view of the pot suspension apparatus. FIG. 3 is another side view of the pot suspension apparatus. In a preferred embodiment, the upper flange 40 is in contact with the bottom of the interior of a pot and the lower flange 50 is in contact with the bottom of the exterior of a pot. Accordingly, in use, the bottom of the pot is secured in place between the upper flange 40 and the lower flange 50. Referring to FIGS. 1, 2, and 3, a fastener 80 prevents the upper flange 40 from moving upward along the rod 10. In a preferred embodiment, the fastener 80 is a wing nut. Referring to FIG. 3, the pin is pushed and locked in place through a small hole in the rod to keep the eye 30 secured in place, which also aids in securing the upper and lower flanges 40, 50 and pot in place.

FIG. 4 is a view of the exterior of the upper flange 40. Referring to FIG. 4, the upper flange 40 also features a plurality of drain holes 90. The drain holes 90 allow water to pass through the upper flange 40 and through to the lower flange 50.

FIG. 5 is a view of the exterior of the lower flange 50. Referring to FIG. 5, the lower flange 50 also features a plurality of drain holes 90, which allow water from the upper flange 40 to pass through the lower flange 50 and into the environment below the pot suspension apparatus. In a preferred embodiment, the drain holes 90 are arranged in a concentric circle around the central bore 100 (see FIG. 6) and each drain hole is approximately 3/16" in diameter.

FIG. 6 is a view of the interior of the upper and lower flanges 40, 50. FIG. 7 is a top view of an o-ring gasket 60. Referring to FIG. 6, the upper and lower flanges 40, 50 features a central bore 100, which receives the rod 10, wherein the upper and lower flanges 40, 50 may be installed onto the pot suspension apparatus and travel along the rod 10 to accommodate varying thicknesses of pots. The central bore 100 may also aid in draining water along the rod 10. In one embodiment, the central bore 100 may be approximately 11/32" to 13/32" in diameter. Still referring to FIG. 6, the interior of the upper and lower flanges 40, 50 features a channel 61. In a preferred embodiment, the channel 61, is designed to house an o-ring gasket 60. The o-ring gasket 60 prevents water from escaping out of the sides of the upper and lower flanges 40, 50 and contains the water flow to within the drain holes 90 and the central bore 100. The gasket 60 may be composed of rubber.

The upper and lower flanges 40, 50 may be composed of metal, plastic, clay, ceramic, resin, or a weather resistant composite.

Figure 8:
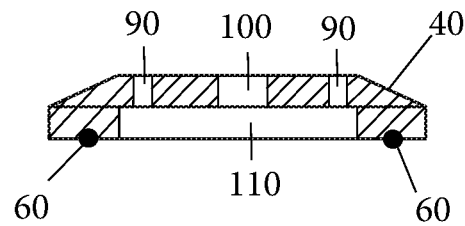
FIG. 8 is a cross-sectional view of the upper flange.

FIG. 8 is an environmental view of the pot suspension apparatus in use. Referring to FIG. 8, the pot suspension apparatus may house multiple pots along the same vertical axis at varying heights.

In use, a user may suspend multiple pots by obtaining a threaded rod 10 with a hook 20. The user then screws the fastener onto the rod 10 to a height that will accommodate the thickness of a selected pot. The user then slides or threads the upper flange 40 onto the rod 10 via the central bore 100, wherein the interior of the upper flange 40 with a gasket 60 is facing away from the fastener 80. The user then inserts the rod 10 with the fastener 80 and upper flange 40 through the central bore of the selected pot, wherein the gasket 60 and the interior of the upper flange 40 is in contact with the bottom of the interior of the pot. The user then slides or threads the lower flange 50 onto the rod 10 via the central bore 100, wherein the interior of the lower flange 50 and gasket of the lower flange 50 is in contact with the bottom of the exterior of the pot. The user then screws the eye 30 in place below the lower flange 50, wherein the eye 30 prevents the upper flange 40 and pot from falling off of the rod. The user then inserts a pin through a hole on the bottom of the rod 10 to further secure the eye 30 in place. Finally, the user obtains a second pot hanging apparatus (either fully assembled with a pot by following the aforementioned steps or waiting to be assembled with a pot) and simply inserts the hook 20 of the second pot hanging apparatus into the eye 30 of the first pot hanging apparatus, wherein the second pot hanging apparatus safely and securely hangs from the first pot hanging apparatus. This may be repeated several times to hang multiple pots.

Figure 9:
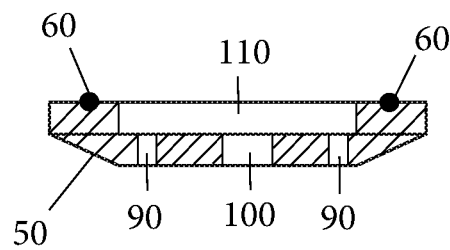
FIG. 9 is a cross-sectional view of the lower flange.
Figure 10:
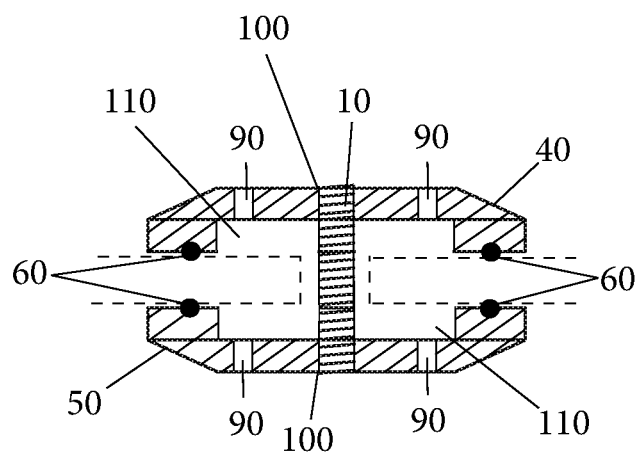
FIG. 10 is a cross-sectional view of the upper and lower flange in use.

Referring to FIGS. 8 through 10, in a preferred embodiment, the upper and lower flange 40, 50 feature a drain chamber 110. In a preferred embodiment, the drain chamber 110 is recessed in the upper and lower flange 40, 50 and is disposed within the o-ring channel 61, wherein the drain holes 90 and central bore 100 are located within the boundaries of the drain chamber 110. Referring to FIG. 10, as previously mentioned, the drain holes 90 allow water to pass through the drain holes 90 of the upper flange 40 into the upper flange's 40 drain chamber 110, down the pot's central drain hole around the rod 10, into the drain chamber 110 of the lower flange 50, and out through the drain holes 90 of the lower flange 50.

The upper and lower flanges 40, 50 may be composed of metal, plastic, clay, ceramic, resin, or a weather resistant composite. The rod 10, eye 30, hook 20, and nuts or fasteners may be composed of metal, plastic, clay, resin, or a weather and UN resistant composite.

Figure 11:
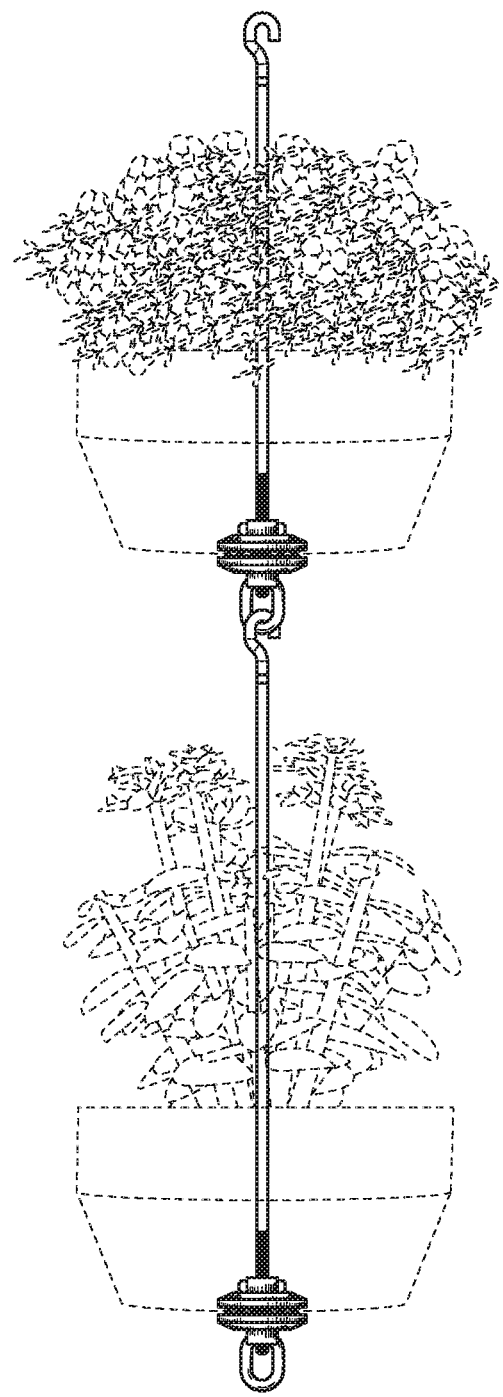
FIG. 11 is an environmental view of the pot suspension apparatus.

FIG. 11 is an environmental view of the pot suspension apparatus in use. Referring to FIG. 11, the pot suspension apparatus may house multiple pots along the same vertical axis at varying heights.

Figure 12:
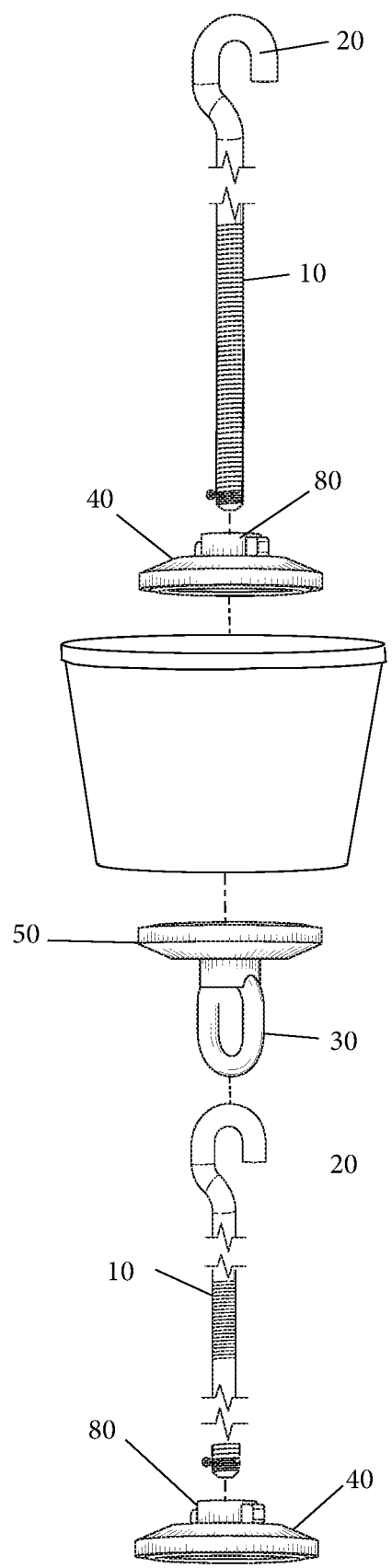
FIG. 12 is an exploded view of the pot suspension apparatus.

FIG. 12 is an exploded view of the pot suspension apparatus in use. Generally, in use, a user may suspend multiple pots by obtaining a threaded rod 10 with a hook 20. The user then screws the fastener 80 onto the rod 10 to a height that will accommodate the thickness of a selected pot. The user then slides or threads the upper flange 40 onto the rod 10 via the central bore 100, wherein the interior of the upper flange 40 with a gasket 60 is facing away from the fastener 80. The user then inserts the rod 10 with the fastener 60 and upper flange 40 through the central drain hole of the selected pot, wherein the gasket 60 and the interior of the upper flange 40 is in contact with the bottom of the interior of the pot. The user then slides or threads the lower flange 50 onto the rod 10 via the central bore 100, wherein the gasket 60 of the lower flange 50 is in contact with the bottom of the exterior of the pot. The user then screws the eye 30 in place below the lower flange 50, wherein the eye 30 prevents the upper flange 40 and lower flange 50 and pot from falling off of the rod 10. The user may then insert a pin through a hole on the bottom of the rod 10 to prevent the eye 30 from unthreading and causing the pots to fall. Finally, the user obtains a second pot hanging apparatus (either fully assembled with a pot by following the aforementioned steps or waiting to be assembled with a pot) and simply inserts the hook 20 of the second pot hanging apparatus into the eye 30 of the first pot hanging apparatus, wherein the second pot hanging apparatus safely and securely hangs from the first pot hanging apparatus. This may be repeated several times to hang multiple pots.

This pot suspension apparatus also allows a user to easily move a pot from being suspended from another pot to being suspended from an eye on a ceiling or other support.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A pot suspension apparatus comprising:
    a rod with a hook on a first end, wherein the rod is threaded on a second end;
    a fastener, wherein the fastener is threaded onto the rod;
    an upper flange, wherein the upper flange is secured to the rod and is further defined by a depression within an interior of the upper flange and an undepressed ledge, wherein the upper flange is further defined by a central bore within the depression, wherein the upper flange is further defined by a plurality of drain holes surrounding the central bore within the depression;
    a first channel that is disposed within the perimeter of the undepressed ledge of the interior of the upper flange;
    a first o-ring gasket disposed within the channel of the interior of the upper flange;
    a lower flange, wherein the lower flange is secured to the rod and is further defined by a depression within an interior of the lower flange and an undepressed ledge, wherein the lower flange is further defined by a central bore within the depression, wherein the lower flange is further defined by a plurality of drain holes surrounding the central bore within the depression;
    a second channel that is placed within the perimeter of the undepressed ledge of the interior of the lower flange;
    a second o-ring gasket that is placed within the channel of the interior of the lower flange;
    a drain chamber that is defined by the depressions in the upper flange and the lower flange; and,
    an eye, wherein the eye is threaded to a bottom of the rod.

2. The pot suspension apparatus of claim 1, wherein the rod features a hole at a bottom.

3. The pot suspension apparatus of claim 1, wherein a pin is inserted into a hole at a bottom of the rod.

4. The pot suspension apparatus of claim 1, wherein the fastener is a wing nut.

5. The pot suspension apparatus of claim 1, wherein the drain holes are approximately 3/16 of an inch in diameter.

6. A method of suspending pots comprising:
    obtaining a first pot suspension apparatus comprising a rod with a hook on a first end, wherein the rod is threaded on a second end and has a hole for a pin, a fastener, an upper flange wherein the upper flange defined by a depression within an interior of the upper flange and an undepressed ledge, wherein the upper flange is further defined by a central bore within the depression, wherein the upper flange is further defined by a plurality of drain holes surrounding the central bore within the depression, a first channel that is disposed within the perimeter of the undepressed ledge of the interior of the upper flange, a first o-ring gasket disposed within the channel of the interior of the upper flange, a lower flange wherein the lower flange is defined by a depression within an interior of the lower flange and an undepressed ledge, wherein the lower flange is further defined by a central bore within the depression, wherein the lower flange is further defined by a plurality of drain holes surrounding the central bore within the depression, a second channel that is placed within the perimeter of the undepressed ledge of the interior of the lower flange, a second o-ring gasket that is placed within the channel of the interior of the lower flange, a drain chamber that is defined by the depressions in the upper flange and the lower flange, the pin, and, an eye;
    obtaining a pot with a central bore;
    threading the fastener onto the rod;
    inserting the upper flange onto the rod, wherein the interior of the upper flange is facing away from the fastener;
    inserting the pot onto the rod, wherein a bottom of an interior of the pot is in contact with the interior of the upper flange;
    inserting the lower flange onto the rod, wherein the interior of the lower flange is in contact with a bottom of an exterior of the pot;
    threading the eye onto a bottom of the rod, whereby the pot and the flanges are secure;
    inserting the pin through a hole on the bottom of the rod, wherein a threaded portion of the eye is above the pin;
    obtaining a second pot suspension apparatus; and, inserting a hook of the second pot suspension apparatus through the eye of the first pot suspension apparatus, whereby multiple of said pots are hanging and suspended.

\* \* \* \* \*